(12) United States Patent
Buhler

(10) Patent No.: US 8,646,202 B1
(45) Date of Patent: Feb. 11, 2014

(54) FISHING DEVICE AND METHOD OF ATTACHMENT TO A FISHING LINE

(76) Inventor: Ronald Buhler, Huntington Beach, CA (US)

( * ) Notice: Subject to any disclaimer, the term of this patent is extended or adjusted under 35 U.S.C. 154(b) by 560 days.

(21) Appl. No.: 12/694,557

(22) Filed: Jan. 27, 2010

(51) Int. Cl.
*A01K 95/02* (2006.01)

(52) U.S. Cl.
USPC .............................. 43/4.5; 43/44.9; 43/44.95

(58) Field of Classification Search
USPC .............. 43/44.87, 44.9, 44.91, 44.92, 44.93, 43/44.94, 44.95, 4.5
See application file for complete search history.

(56) References Cited

U.S. PATENT DOCUMENTS

| | | | |
|---|---|---|---|
| 595,664 A | 12/1897 | Wenger | |
| 1,848,600 A * | 3/1932 | Best | 43/43.1 |
| 2,230,751 A | 2/1941 | Johnson | |
| 2,293,070 A * | 8/1942 | Miller et al. | 264/297.6 |
| 2,393,070 A | 1/1946 | Saloun | |
| 2,474,498 A | 6/1949 | Schwabe | |
| 2,831,288 A * | 4/1958 | Killebrew | 43/43.11 |
| 3,800,459 A | 4/1974 | Fleischaker | |
| 3,913,256 A * | 10/1975 | Morris et al. | 43/17.5 |
| 3,967,407 A | 7/1976 | Halbasch | |
| 4,796,377 A * | 1/1989 | Hosegood et al. | 43/43.1 |
| 4,986,023 A | 1/1991 | Bucholz | |
| 5,031,351 A | 7/1991 | Rogel | |
| 5,197,220 A * | 3/1993 | Gibbs et al. | 43/42.09 |
| 5,245,783 A * | 9/1993 | Cumiskey | 43/42.37 |
| 6,073,386 A * | 6/2000 | Firmin | 43/44.87 |
| 7,610,715 B2 * | 11/2009 | Cowin | 43/44.91 |
| 2006/0288632 A1 * | 12/2006 | Cowin | 43/44.91 |

* cited by examiner

*Primary Examiner* — David Parsley
(74) *Attorney, Agent, or Firm* — Eric Karich

(57) ABSTRACT

A fishing device has a device body having an outer surface, a conduit extending through the device body, an annular groove in the outer surface of the device body extending at least partially around the device body, and an annular wedge positioned around the device body and within the annular groove. In use, a fishing line is positioned through the conduit and wrapped completely around the annular groove. The annular wedge is adapted to lock the fishing line in the annular groove.

1 Claim, 2 Drawing Sheets

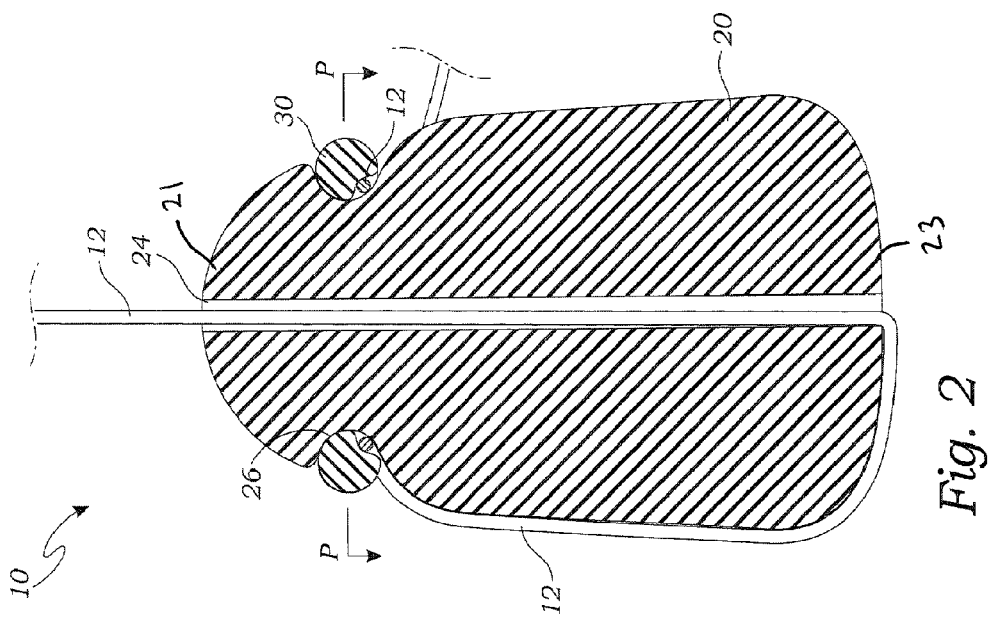
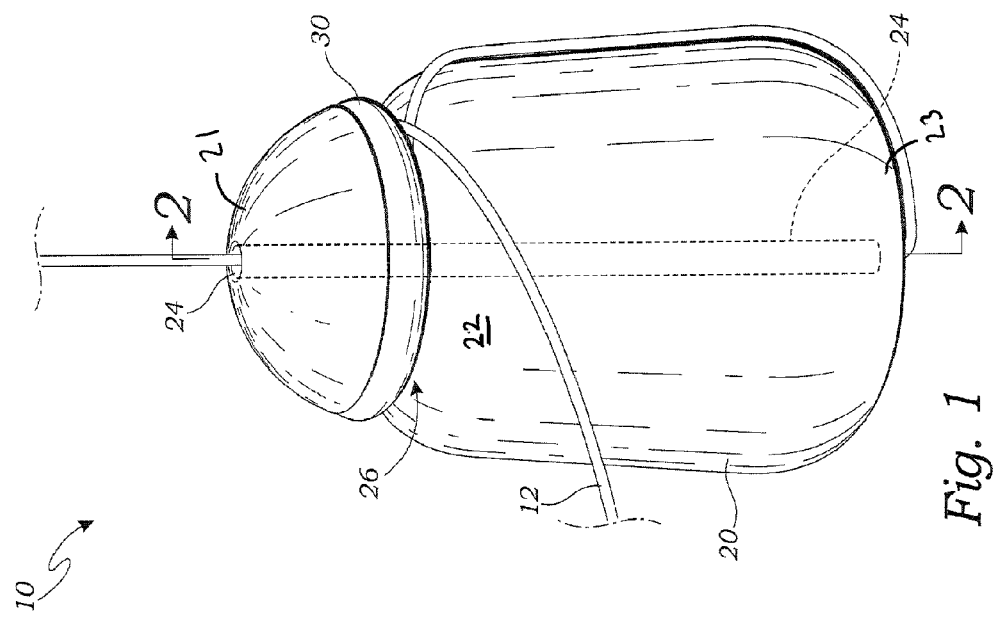

FISHING DEVICE AND METHOD OF ATTACHMENT TO A FISHING LINE

CROSS-REFERENCE TO RELATED APPLICATIONS

Not Applicable

BACKGROUND OF THE INVENTION

1. Field of the Invention

This invention relates generally to fishing devices, and more particularly to a fishing lure, weight, or similar device, that is adapted to be quickly, easily, and securely attached to and removed from a fishing line.

2. Description of Related Art

Various fishing devices such as lures and weights are known in the art, and teach a variety of methods of attachment of the device to a fishing line. Rogel, U.S. Pat. No. 5,031,351 for example, describes a two piece slip-sinker for use on fishing lines comprising a two sectional sinker adapted to separate at a linear disposed, axial central opening to receive a fishing line. The two piece slip-sinker is maintained as a unitary sinker by means of an elastomeric O-ring engaging a circumferential periphery channel disposed in the outer surface in the assembled slip-sinker and oriented transverse to the axial through opening. The two piece slip-sinker contains internal engaging means for interlocking the interfaces of the two sections and preventing interface movement between the two sections while locked in place by the elastomeric o-ring. When the two sections/pieces are held together with the elastomeric o-ring the sinker is able to slip up and down the line.

Halbasch, U.S. Pat. No. 3,967,407 describes a bob or float for use with fishing lines and more particularly to a sectional float which is slidingly mounted on a fishing line.

Fleischaker, U.S. Pat. No. 3,800,459 describes a quick change sliding sinker having a top and bottom end. A slide hole extends through the sinker body from one side of the sinker to the other and is located closer to the top end of the sinker than the bottom end. A fishing line entry spot is provided in the sinker. One end of the slot connects with the hole and the other end extends through one side margin of the sinker at a point located closer to the bottom end of the sinker than the hole. A line retaining means such as a rubber O-ring is provided on the side of the body of the sinker between the hole and the other end of the slot to encircle the body of the sinker and cover the slot, thereby preventing the line from falling out of the hole, while allowing the weight to slide freely up and down the line.

Bucholz, U.S. Pat. No. 4,986,023, teaches a line tie including a top portion and a base connected to an attached member, such as a fishing float. The top portion includes a J-shaped axial slot that extends down from the top portion. An O-ring is positioned around the top portion to trap the line within the J-shaped axial slot.

Johnson, U.S. Pat. No. 2,230,751, teaches a releasable casting weight having a body with a radial slit, the radial slit terminating in another elongate slit that extends at an acute angle to the radial slit. The casting weight is designed to remain attached to the line during the cast, and then release the line.

Fishing floats that include a vertical slot for receiving a line, and a horizontal slot for receiving an O-ring are disclosed in Saloun, U.S. Pat. No. 2,393,070, and Schwabe, U.S. Pat. No. 2,474,498. A similar float is also taught by Wenger, U.S. Pat. No. 595,664. All of the above-described references are hereby incorporated by reference in full.

Cowin, U.S. Pat. No. 7,610,715, teaches a strike indicator with a buoyant body, a through-conduit, and an annular groove having an O-ring positioned therearound. The fishing line is threaded through the through-conduit and the O-ring is positioned over the line so that the line goes under the O-ring in two locations.

The prior art teaches various fishing devices that include axial conduits for receiving a fishing line, or two halves of fishing devices that are bound together to form a similar conduit. However, the prior art does not teach a fishing device that includes a conduit through the device, an annular groove around the device, and an annular wedge for wedging the fishing line in the groove and thereby locking the device on the fishing line. The present invention fulfills these needs and provides further related advantages as described in the following summary.

SUMMARY OF THE INVENTION

The present invention teaches certain benefits in construction and use which give rise to the objectives described below.

The present invention provides a fishing device adapted to be attached to a fishing line. The fishing device comprises a device body having an outer surface; a conduit extending through the device body; an annular groove in the outer surface of the device body extending at least partially around the device body; and an annular wedge positioned around the device body and within the annular groove, the annular wedge being adapted to lock the fishing line in the annular groove.

A primary objective of the present invention is to provide a fishing device having advantages not taught by the prior art.

Another objective is to provide a fishing device that includes a conduit through the device, an annular groove around the device, and an annular wedge for wedging the fishing line in the groove and thereby locking the device on the fishing line.

A further objective is to provide a fishing device that may be quickly and easily attached to and detached from the fishing line without tying a knot.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings:

FIG. 1 is a perspective view of a fishing weight according to one embodiment of the present invention;

FIG. 2 is a sectional view thereof taken along line 2-2 in FIG. 1; and

DETAILED DESCRIPTION OF THE INVENTION

Figure 3:
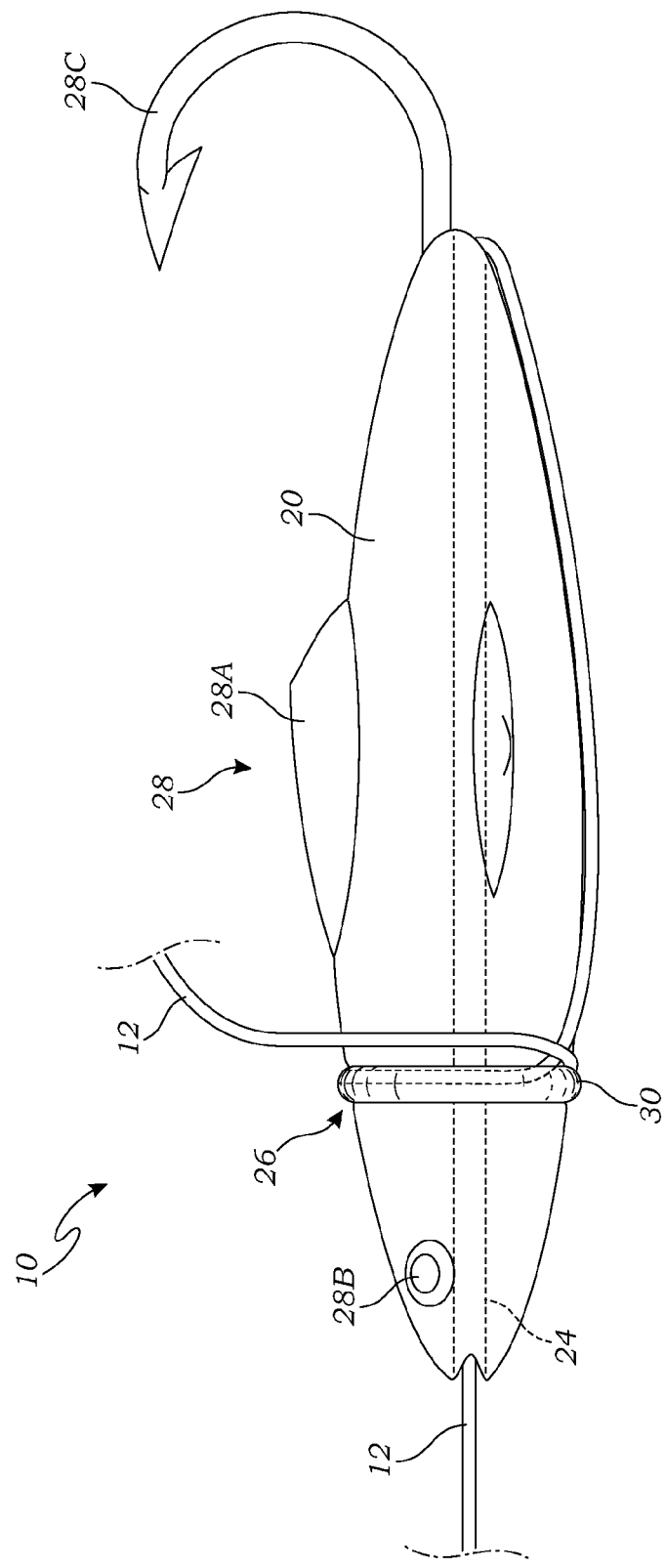
FIG. 3 is a side elevational view of a fishing lure illustrating a second embodiment of the present invention.

The above-described drawing figures illustrate the invention, a fishing device 10 adapted to be attached to a fishing line 12.

FIG. 1 is a perspective view of the fishing weight according to one embodiment of the present invention, wherein the fishing device 10 is a fishing weight. FIG. 2 is a sectional view thereof taken along line 2-2 in FIG. 1.

As shown in FIGS. 1 and 2, the, the fishing device 10 comprises a device body 20 having an outer surface 22, and a conduit 24 extending through the device body 20. The device body 20 of FIG. 1 is a metal fishing weight of standard construction. In alternative embodiments, the device body 20 may be made of other materials, and may be formed in alternative shapes, as is well known in the art.

As illustrated in FIG. 1, a groove 26 is formed in the outer surface 22 of the device body 20 and, extends at least partially around the device body 20. In the present embodiment, the groove 26 is an annular groove 26 that extends completely around the device body 20. In the present embodiment, the annular groove 26 extends around the conduit 24, such that the conduit 24 is orthogonal to a plane P of the annular groove 26.

An annular wedge 30 is positioned around the device body 20 and within the annular groove 26. The annular wedge 30 is adapted to lock the fishing line 12 in the annular groove 26. In one embodiment, the annular wedge 30 is a resilient material, such as plastic or rubber, and is adapted to be stretched over the device body 20 so that it is firmly placed within the annular groove 26. In one embodiment, the annular wedge 30 is a rubber O-ring, although alternative materials and structures may be used.

FIGS. 1-2 also illustrate a method for weighting a fishing line 12 using the fishing device 10 described above. In use, the fishing line 12 is threaded through the conduit 24 of the device body 20, and the fishing line 12 is wrapped completely around the device body 20 so that the fishing line 12 is positioned within the groove 26 and under the annular wedge 30. The annular wedge 30 functions to lock the fishing line 12 in place so that it does not fall out of the annular groove 26. The fishing line 12 may be partially wedged under the annular wedge 30, but it is preferably wrapped at least once completely the fishing device 10, and may be wrapped completely around multiple times for a secure connection.

In the present embodiment, the fishing line 12 is threaded through the conduit 24 of the weighted body 20 from a top end 21 of the weighted body 20 to a bottom end 23 of the weighted body 20. The fishing line 12 is then threaded from the bottom end 23 of the weighted body 20 to the annular groove 26. The fishing line 12 is wrapped around the annular groove 26 so that the fishing line 12 is wedged under the O-ring 30 of the annular groove 26. This enables the fishing line 12 to be quickly and easily attached to the weighted body 20.

This attachment mechanism enables the fishing device 10 to be quickly and easily attached and detached. Friction between the fishing line 12 and the annular groove 26, especially if the fishing line 12 is wrapped completely around the fishing device 10 multiple times, is sufficient to lock the fishing device 10 on the fishing line 12 in a secure manner.

FIG. 3 is a side elevational view of a fishing lure illustrating a second embodiment of the present invention, wherein the fishing device 10 is a fishing lure. In this embodiment, the device body 20 may be constructed of molded material (e.g., plastic, rubber and metal) and the outer surface 22 may include lure features 28 (e.g., molded fins 28A, simulated eyes 28B, a hook 28C, etc.). The fishing line 12 is in the process of being wrapped around the lure body 20; it may be wrapped a single time for a secure connection, and may be wrapped around multiple times for added security. In any case, it may be attached quickly and easily, with only a simple wrapping motion and pulling the fishing line 12 tight to wedge it under the annular wedge 30.

While conceptually similar to the above-described embodiment, the embodiment of FIG. 3 illustrates how the concept may be applied to a variety of fishing device 10s, so that they may be quickly added to or removed from the fishing line 12. This may be important in certain situations, where a quick change of weights and/or lures may be needed, but the change must be fast enough to enable the fisherman to capture a given opportunity.

The terminology used in the specification provided above is hereby defined to include similar and/or equivalent terms, and/or alternative embodiments that would be considered obvious to one skilled in the art given the teachings of the present patent application. Additionally, the words "a," "an," and "one" are defined to include one or more of the referenced item unless specifically stated otherwise. Also, the terms "have," "include," "contain," and similar terms are defined to mean "comprising" unless specifically stated otherwise.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A method for attaching a fishing weight to a fishing line, the method comprising the steps of:

providing the fishing weight comprising a weighted body having a top end, a bottom end, an outer surface, an annular groove in the outer surface of the weighted body between the top end and the bottom end and extending around the weighted body, the annular groove being disposed in a plane, a conduit extending through the weighted body through and orthogonal to the plane of the annular groove; and a resilient O-ring positioned around the weighted body and within the annular groove;

threading the fishing line through the conduit of the weighted body from the top end of the weighted body to the bottom end of the weighted body, and from the bottom end to the annular groove; and wrapping the fishing line extending from the bottom end around the device body so that the fishing line is positioned within the annular groove and under the resilient O-ring such that the resilient O-ring functions to lock the fishing line in the annular groove.

* * * * *